(12) United States Patent
Iwayama

(10) Patent No.: US 8,566,351 B2
(45) Date of Patent: Oct. 22, 2013

(54) SYSTEM AND PROGRAM FOR GENERATING BOOLEAN SEARCH FORMULAS

(75) Inventor: Makoto Iwayama, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/226,935

(22) Filed: Sep. 7, 2011

(65) Prior Publication Data

US 2012/0197940 A1 Aug. 2, 2012

(30) Foreign Application Priority Data

Jan. 28, 2011 (JP) ................................. 2011-016661

(51) Int. Cl.
*G06F 17/30* (2006.01)

(52) U.S. Cl.
USPC ........... 707/780; 707/706; 707/749; 707/758; 707/765

(58) Field of Classification Search
USPC .......................... 707/780, 706, 749, 758, 765
See application file for complete search history.

(56) References Cited

U.S. PATENT DOCUMENTS

| | | | | |
|---|---|---|---|---|
| 6,446,065 B1* | 9/2002 | Nishioka et al. | | 1/1 |
| 7,707,023 B2* | 4/2010 | Ejerhed | | 704/1 |
| 7,836,060 B1* | 11/2010 | Rennison | | 707/749 |
| 7,870,117 B1* | 1/2011 | Rennison | | 707/706 |
| 8,150,827 B2* | 4/2012 | Kraftsow | | 707/706 |
| 8,250,079 B2* | 8/2012 | Scholtes et al. | | 707/750 |
| 8,463,810 B1* | 6/2013 | Rennison | | 707/771 |
| 2002/0177991 A1* | 11/2002 | Ejerhed | | 704/2 |
| 2003/0126165 A1* | 7/2003 | Segal et al. | | 707/206 |
| 2003/0177111 A1* | 9/2003 | Egendorf et al. | | 707/3 |
| 2004/0024756 A1* | 2/2004 | Rickard | | 707/3 |
| 2005/0086209 A1* | 4/2005 | Chou | | 707/3 |
| 2008/0162469 A1* | 7/2008 | Terayoko et al. | | 707/5 |
| 2008/0189273 A1* | 8/2008 | Kraftsow et al. | | 707/5 |
| 2009/0248652 A1* | 10/2009 | Iwayama et al. | | 707/4 |
| 2009/0248674 A1* | 10/2009 | Suzuki et al. | | 707/5 |
| 2010/0198802 A1* | 8/2010 | Kraftsow et al. | | 707/706 |
| 2011/0071833 A1* | 3/2011 | Shi et al. | | 704/251 |
| 2011/0082860 A1* | 4/2011 | Xing et al. | | 707/728 |
| 2011/0113357 A1* | 5/2011 | Rosu et al. | | 715/764 |
| 2011/0125728 A1* | 5/2011 | Smyros et al. | | 707/711 |
| 2011/0145269 A1* | 6/2011 | Kraftsow et al. | | 707/766 |
| 2011/0191354 A1* | 8/2011 | Scholtes et al. | | 707/749 |
| 2012/0179703 A1* | 7/2012 | Ajitomi et al. | | 707/765 |

FOREIGN PATENT DOCUMENTS

JP 10-74210 A 3/1998

OTHER PUBLICATIONS

Manning et al., Introduction to Information Retrieval, Cambridge University Press, Jul. 7, 2008, pp. 142-149 and 224.*

(Continued)

*Primary Examiner* — Thanh-Ha Dang
(74) *Attorney, Agent, or Firm* — Mattingly & Malur, PC

(57) ABSTRACT

To provide a technique for accurately and efficiently generating Boolean search formulas that serve as a basis of similarity search. A Boolean search formula generation apparatus according to the present invention establishes Boolean search formulas expressed in a standard sum of products form connecting products of search terms by a sum and evaluates the Boolean search formulas based on a recall and a precision. The Boolean search formula generation apparatus repeats connecting the products of the search terms with maximum evaluation values by a sum to establish a Boolean search formula.

15 Claims, 10 Drawing Sheets

| Precision | |
|---|---|
| 0.98 | Optometry |
| | + |
| 0.33 | Inspection * Personnel |
| | + |
| 0.86 | Ophthalmology * Apparatus |
| | + |
| 0.16 | Optical * Imaging * System |

↓ Precision ≧ 0.8

| | |
|---|---|
| 0.98 | Optometry |
| | + |
| 0.86 | Ophthalmology * Apparatus |

(56) References Cited

OTHER PUBLICATIONS

D. Cutting et al., Scatter/Gather: A Cluster-based Approach to Browsing Large Document Collections, ACM SIGIR'92 pp. 318-329, 1992.

Y. Matsuike et al., Supporting the Query Modification by Making Keyword Formula of an Outline of Retrieval Result, Proceedings of Data Engineering Workshop (DEWS 2005), 1Ci9, 2005.

* cited by examiner

701: $L = t\_1 * t\_2 * \cdots * t\_k$

702: $N$: The number of all documents to be searched

703: $H(L) \doteq P(L) N$

704: $\doteq P(t\_1) P(t\_2) \cdots P(t\_k) N$

705: $\doteq \dfrac{H(t\_1)}{N} \dfrac{H(t\_2)}{N} \cdots \dfrac{H(t\_k)}{N} N$

706: $= \dfrac{H(t\_1) H(t\_2) \cdots H(t\_k)}{N^{k-1}}$ $$\text{F-measure} = \frac{2\,|D \wedge H(L)|}{|D| + |H(L)|}$$

$$\approx \frac{2\,|D|\,|S \wedge H(L)|}{|S|\,(|D| + |H(L)|)}$$

Precision 0.98    Optometry
              +
    0.33    Inspection * Personnel
              +
    0.86    Ophthalmology * Apparatus
              +
    0.16    Optical * Imaging * System Precision $\geqq 0.8$ 0.98    Optometry
              +
    0.86    Ophthalmology * Apparatus

SYSTEM AND PROGRAM FOR GENERATING BOOLEAN SEARCH FORMULAS

CLAIM OF PRIORITY

The present application claims priority from Japanese patent application JP 2011-016661 filed on Jan. 28, 2011, the content of which is hereby incorporated by reference into this application.

BACKGROUND OF THE INVENTION

1. Field of the Invention

The present invention relates to a technique for generating Boolean search formulas for searching documents.

2. Background Art

There are mainly two types of methods in document search. A first method is a method in which a Boolean formula with a combination of presences of keywords (arbitrary character strings) is inputted, and only documents that the Boolean formula evaluates to "true" are outputted as search results. The method is generally called a full text search. The Boolean formula with a combination of presences of keywords will be called a Boolean search formula. A second method is a method in which a text is inputted, and documents similar to the text are ranked in the order of similarity and outputted as search results. The method is generally called a similarity search.

A topic to be searched can be directively described as a text in the similarity search, and even a person who is not an expert of the document search can easily use the similarity search. The search results are displayed with ranks, and the user can preferentially examine higher-ranked documents which seem important. On the other hand, it is difficult to check the reason why the documents are ranked higher.

Factors of the similarity in the similarity search include overlapping of word distribution between the inputted text and documents obtained as search results and the length of the documents obtained as search results. Therefore, it is difficult to simply express the basis of the similarity in natural language. The mechanism of the similarity search is hidden, and the basis of the similarity is often undisclosed.

If the basis on which the documents are obtained as the search results is not known, the user cannot recognize how much the search results need to be examined. The user cannot check whether or not the desired topic is completely searched.

The similarity search is suitable for a situation in which it is sufficient if even one desired document exists in higher ranked few documents, as in the search of Web pages. However, the similarity search is rather inefficient in a situation in which a topic needs to be comprehensively examined, as in the search of patent documents and academic papers.

Meanwhile, in the full text search, a topic to be searched needs to be expressed by search formulas formed by Boolean expressions of keywords, and know-how and expertise for establishing the Boolean search formulas are required. However, since the documents are searched based on the Boolean search formulas, the standard is clear and plain for the user. If the user examines all searched documents, it can be stated that all documents of the topic expressed by the Boolean search formula are examined.

To alleviate the problem of the similarity search, some methods are proposed. In JP Patent Publication (Kokai) No. 10-74210A (1998), distinctive words in upper several dozen documents searched in the similarity search are extracted, and the words are outputted with the search results. An overview of the search results can be understood by viewing a set of the extracted distinctive words.

In "Scatter/Gather: a cluster-based approach to browsing large document collections", Cutting, D., Karger, D., Pedersen, J., Tukey, J. pp. 318-329, ACM SIGIR'92, 1992, the search results are displayed by clustering the search results into several groups based on the similarity between the documents. As a result of the clustering, the topics included in the search results are automatically classified. Therefore, features of the search results can be more easily understood compared to the method of JP Patent Publication (Kokai) No. 10-74210A (1998).

In "Supporting the Query Modification by Making Keyword Formula of an Outline of Retrieval Result", Yasunori Matsuike, Koji Zettsu, Satoshi Oyama, Katsumi Tanaka, Proceedings of Data Engineering Workshop (DEWS 2005), 1Ci9, 2005, Boolean formulas of keywords as a basis of the search results are generated from the search results. In the document, keywords that cover the search results as widely as possible are found. If the coverage of the found keywords is not sufficient, keywords that cover the remaining document set are found again. This is repeated to find keywords that can sufficiently cover the search results, and the keywords are connected by products and a sum to generate a Boolean search formula. The generated Boolean search formula is presented to the user as a tree-structured graph.

In the techniques described in JP Patent Publication (Kokai) No. 10-74210A (1998) and "Scatter/Gather: a cluster-based approach to browsing large document collections", Cutting, D., Karger, D., Pedersen, J., Tukey, J. pp. 318-329, ACM SIGIR'92, 1992, distinctive words included in the results of the similarity search are extracted, and the words can be presented as the basis of the similarity search. However, the distinctive words do not always indicate the accurate basis of the similarity search.

In the technique described in "Supporting the Query Modification by Making Keyword Formula of an Outline of Retrieval Result", Yasunori Matsuike, Koji Zettsu, Satoshi Oyama, Katsumi Tanaka, Proceedings of Data Engineering Workshop (DEWS 2005), 1Ci9, 2005, only the high-coverage of the results of the similarity search serves as the evaluation standard in extracting the words. Therefore, the extracted words may hit a large number of documents (noise) other than the results of the similarity search. The words are not appropriate as the basis of the similarity search.

The present invention has been made to solve the problems, and an object of the present invention is to provide a technique for accurately and efficiently generating Boolean search formulas that serve as a basis for similarity search.

SUMMARY OF THE INVENTION

A Boolean search formula generation apparatus according to the present invention establishes Boolean search formulas expressed in a standard sum of products form connecting products of search terms by a sum and evaluates the Boolean search formulas based on a recall (high cover rate) and a precision (low noise rate). The Boolean search formula generation apparatus repeats connecting the products of the search terms with maximum evaluation values by a sum to establish a Boolean search formula.

According to the Boolean search formula generation apparatus of the present invention, a product with a maximum evaluation value is searched for each product of search terms, and the products are connected by a sum. Therefore, the search space of the Boolean search formulas expressed in a standard sum of products form can be efficiently searched for each term of the products. Furthermore, the Boolean search formula is evaluated in each product of search terms based on the recall and the precision. Therefore, the Boolean search formula can be optimized for each product to improve the accuracy of the Boolean search formula.

DETAILED DESCRIPTION OF THE PREFERRED EMBODIMENTS

First Embodiment

Figure 1:
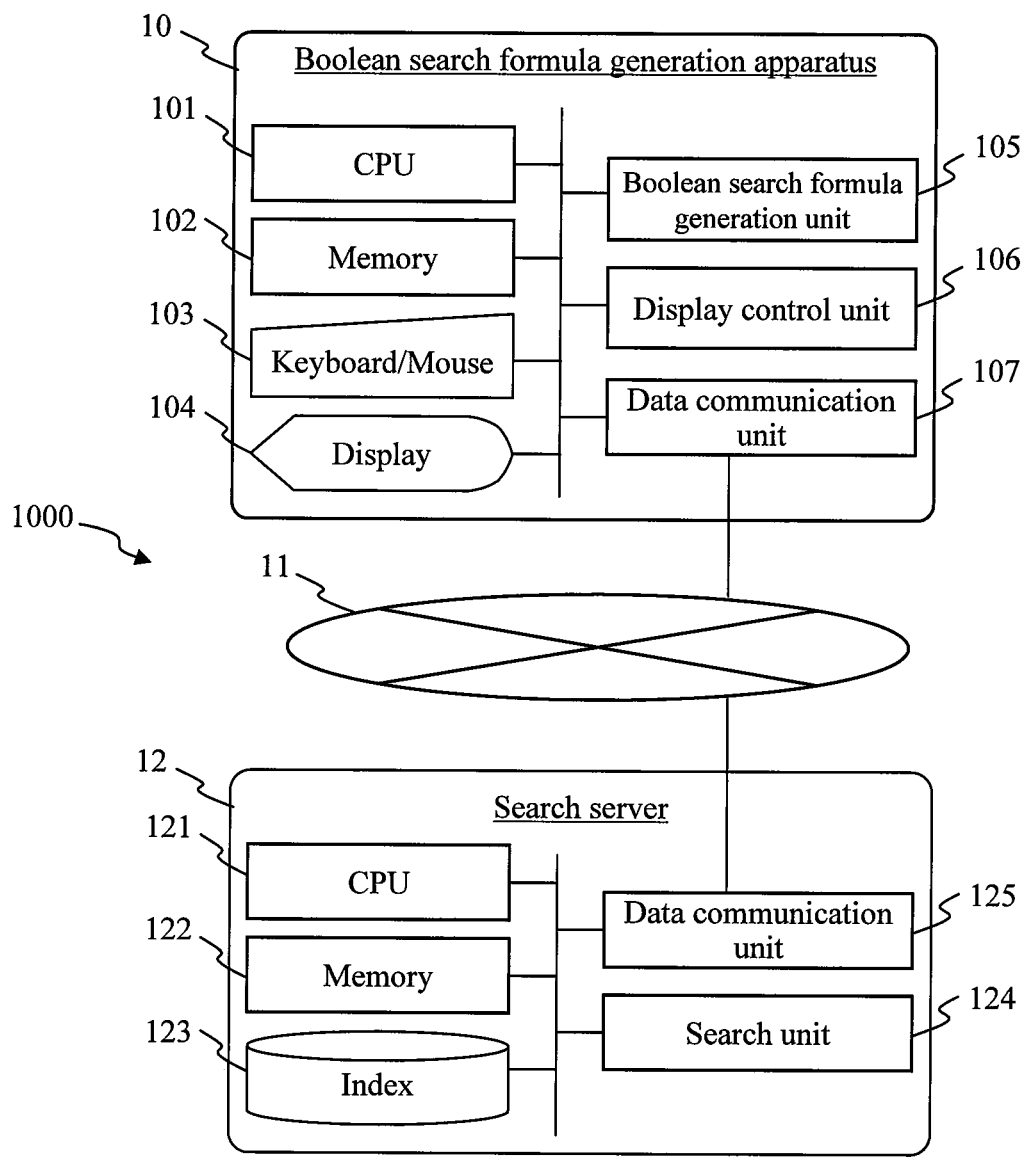
FIG. 1 is a block diagram of a search system 1000 according to a first embodiment.

FIG. 1 is a block diagram of a search system 1000 according to a first embodiment of the present invention. The search system 1000 includes a Boolean search formula generation apparatus 10 and a search server 12. The Boolean search formula generation apparatus 10 and the search server 12 are connected via a network 11.

The Boolean search formula generation apparatus 10 is an apparatus that generates Boolean search formulas for obtaining search results from the search results obtained as a result of searching documents. The Boolean search formula generation apparatus 10 includes a CPU (Central Processing Unit) 101, a memory 102, a keyboard/mouse 103, a display 104, a Boolean search formula generation unit 105, a display control unit 106, and a data communication unit 107.

The CPU 101 executes a process of controlling the operation of the Boolean search formula generation apparatus 10. The CPU 101 also executes programs described later. The memory 102 is a storage device that stores the programs executed by the CPU 101, data necessary to execute the programs, etc. The keyboard/mouse 103 receives an operation input from the user and outputs the operation input to the CPU 101. The display 104 displays a search result, etc., on a screen in accordance with an instruction of the display control unit 106. The data communication unit 107 is a communication interface for data communication via the network 11, and for example, a LAN (Local Area Network) interface that uses a TCP/IP protocol for communication can be used to constitute the data communication unit 107.

The Boolean search formula generation unit 105 generates Boolean search formulas for obtaining search results from the search results obtained as a result of searching documents. The Boolean search formula generation unit 105 communicates with the search server 12 as necessary to collect data necessary to generate the Boolean search formulas.

The display control unit 106 displays, on the display 104, a search interface screen 20 described in FIG. 2 later. The display control unit 106 communicates with the search server 12 as necessary to collect data necessary for the screen display.

The Boolean search formula generation unit 105 and the display control unit 106 can be constituted using hardware, such as a circuit device that realizes the functions, or can be constituted as programs with the functions. When the Boolean search formula generation unit 105 and the display control unit 106 are implemented as programs, the CPU 101 executes the programs to carry out operations of the functional units.

The data communication unit 107 is equivalent to a "search result acquisition unit" according to the present invention. The display 104 is equivalent to a "display unit".

The search server 12 is an apparatus that searches documents to transmit the search results to the Boolean search formula generation apparatus 10. The search server 12 includes a CPU 121, a memory 122, a search index 123, a search unit 124, and a data communication unit 125.

The CPU 121 executes a process of controlling the operation of the search server 12. The CPU 121 also executes programs described later. The memory 122 is a storage device that stores the programs executed by the CPU 121, data necessary to execute the programs, etc. The search index 123 is data in which data to be searched is reshaped into a data structure (index) suitable for the search. The search index 123 can be stored in a storage medium such as a magnetic storage medium. The data communication unit 125 is a communication interface for data communication via the network 11, and for example, a LAN interface for communication using the TCP/IP protocol can be used to constitute the data communication unit 125.

The search unit 124 receives a request for searching documents from the Boolean formula generation apparatus 10 and uses the search index 123 to search documents corresponding to the Boolean search formulas. The search unit 124 transmits search results to the Boolean search formula generation apparatus 10.

The search unit 124 can be constituted using hardware such as a circuit device that realizes the functions or can be constituted as a program with the functions. When the search unit 124 is included as a program, the CPU 121 executes the program to carry out the operation of the search unit 124.

Figure 2:
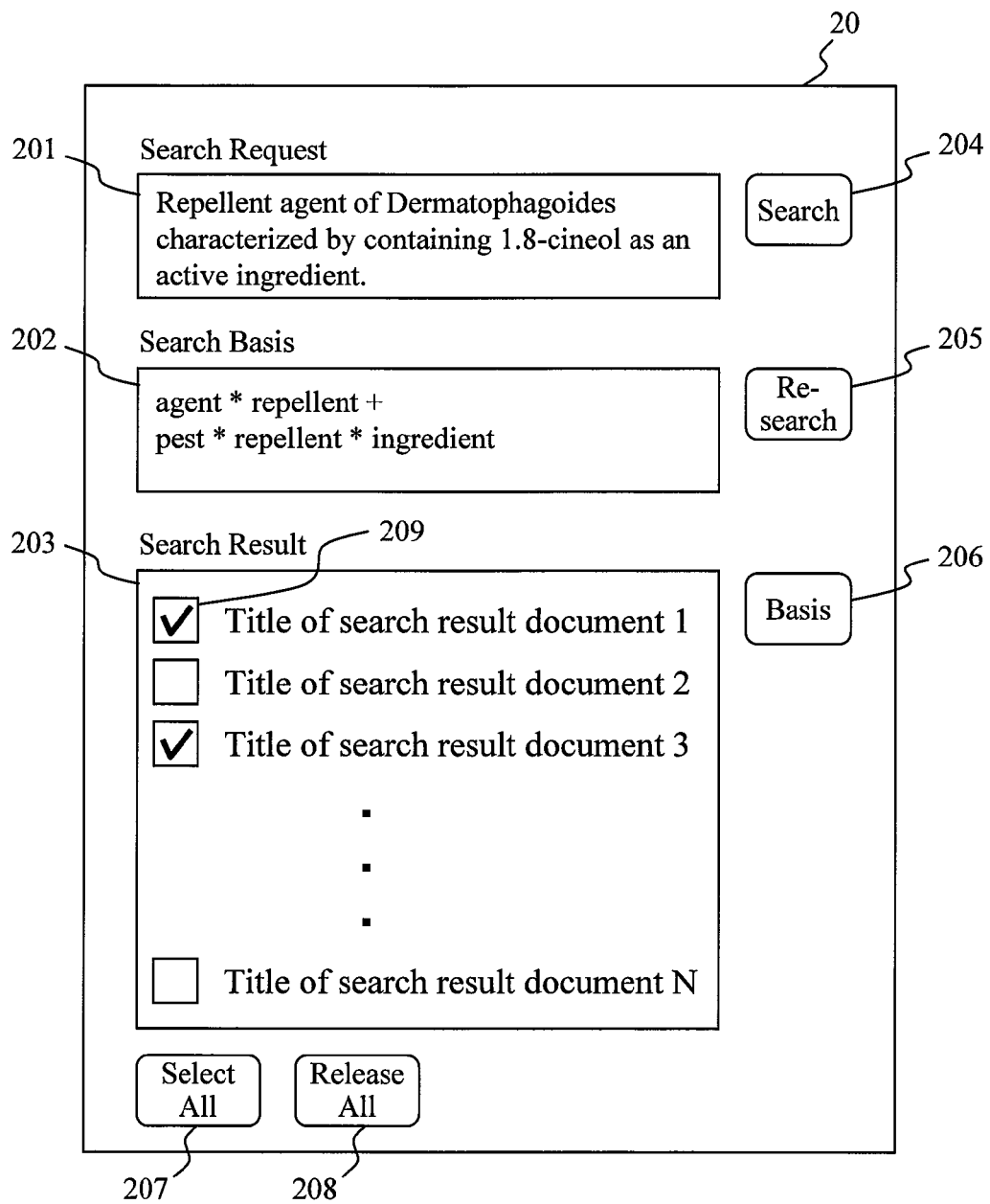
FIG. 2 is a diagram showing an example of screen image of a search interface screen 20 displayed on a screen by a display 104 of a Boolean search formula generation apparatus 10.

FIG. 2 is a diagram showing an example of screen image of the search interface screen 20 displayed by the display 104 of the Boolean search formula generation apparatus 10. The search interface screen 20 receives an operation input from the user and displays, on the screen, the search results and the Boolean search formulas generated by the Boolean search formula generation unit 105. An operational procedure of the operation of the search interface screen 20 will be described.
(FIG. 2: Operational Procedure Step 1)

The user inputs a search request to a text input area 201. The user inputs a text to carry out the similarity search and inputs a Boolean search formula to carry out the full text search. An example of carrying out the similarity search is illustrated here. A text "Repellent agent of Dermatophagoides characterized by containing 1,8-cineol as an active ingredient." is inputted as a search request.

(FIG. 2: Operational Procedure Step 2)

When the user clicks a search button 204, the display control unit 106 acquires a character string inputted to the text input area 201 and transmits the search request including the character string as a search condition to the search server 12 via the data communication unit 107.

(FIG. 2: Operational Procedure Step 3)

The search server 12 receives the search request, and the search unit 124 uses the search index 123 to search documents corresponding to the search request. The search unit 124 acquires identifiers, titles, etc., of the documents corresponding to the search and transmits the search results to the Boolean search formula generation apparatus 10.

(FIG. 2: Operational Procedure Step 4)

The display control unit 106 receives the search results via the data communication unit 107 and displays the search results in a display area 203 in a list format. The display area 203 displays the titles, etc., of the documents included in the search results. Check boxes 209 for switching select/non-select are arranged next to the titles. The Boolean search formulas are to be generated for the documents in which the checks boxes are checked. All documents displayed in the display area 203 are selected in the default setting. All documents can be selected altogether by clicking a select all button 207. All documents can be selected and released altogether by clicking a release all button 208.

(FIG. 2: Operational Procedure Step 5)

When the user clicks a basis button 206, the display control unit 106 transfers the identifiers of the selected documents to the Boolean search formula generation unit 105. The Boolean search formula generation unit 105 uses a method described in FIGS. 3 to 6 described later to generate a Boolean search formula that can accurately search the documents selected on the search interface screen 20.

(FIG. 2: Operational Procedure Step 6)

The display control unit 106 displays the Boolean search formula generated by the Boolean search formula generation unit 105 in the text input area 202. A Boolean search formula "agent*repellent+pest*repellent*ingredient" is displayed here. This indicates that if the Boolean search formula is used to carry out the full text search, the currently selected documents can be searched as accurate as possible. The user can recognize the basis of the search result obtained by the similarity search as the Boolean search formula equivalent to the search result.

(FIG. 2: Operational Procedure Step 6: Supplement)

In the example shown in FIG. 2, although a word "Dermatophagoides" is inputted to the text input area 201 in the original similarity search, a more general keyword "pest" is generated in the Boolean search formula displayed in the text input area 202. More specifically, it can be stated that the result of the similarity search using the text inputted to the text input area 201 is equivalent to the result of the full text search using the general keyword "pest". The user can compare the display contents of the text input areas 201 and 202 to check whether a comprehensive search is carried out. The user can also check the contents of the selected documents to completely examine all documents related to the "pest" including Dermatophagoides.

(FIG. 2: Operational Procedure Step 7)

The user can also correct the Boolean search formula generated by the Boolean search formula generation unit 105 in the text input area 202. When the user clicks a re-search button 205 after correcting the Boolean search formula, the display control unit 106 acquires the Boolean search formula inputted to the text input area 202 and transmits a search request, which includes the Boolean search formula as a search condition, to the search server 12 via the data communication unit 107. The search server 12 uses the Boolean search formula to carry out the search, and the display control unit 106 displays the search result in the display area 203.

(FIG. 2: Operational Procedure Step 7: Supplement)

For example, the current search result may include documents related to pests other than Dermatophagoides. If only documents specific to Dermatophagoides are desired, "pest" displayed in the text input area 202 can be replaced with "Dermatophagoides", and a Boolean search formula "agent*repellent+Dermatophagoides*repellent*ingredient" can be used to carry out the search again.

The configuration of the search system 1000 has been described. A method of generating Boolean search formulas by the Boolean search formula generation unit 105 will now be described.

Figure 3:
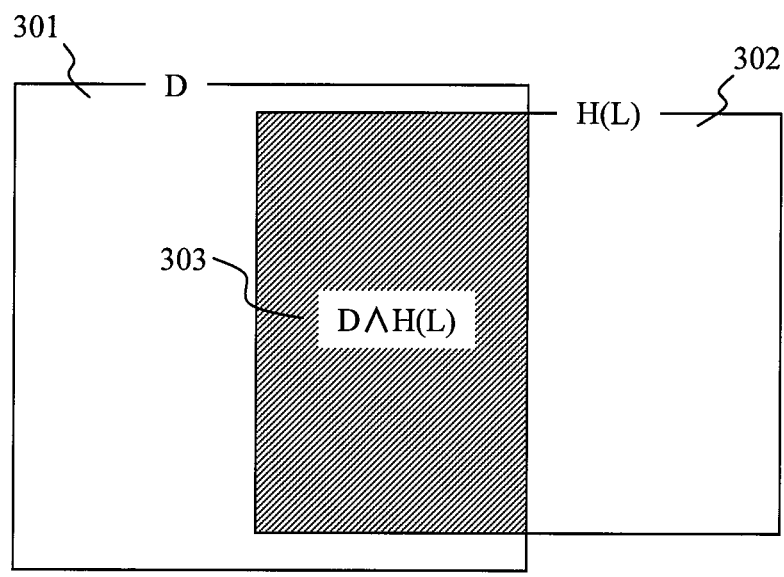
FIG. 3 is a diagram showing a relationship between a document set D (301) as a base set for which a Boolean search formula will be generated and a document set H(L) (302) that can be searched by a generated Boolean search formula L.

FIG. 3 is a diagram showing a relationship between a document set D (301) as a base set for which a Boolean search formula will be generated and a document set H(L) (302) that can be searched by a generated Boolean search formula L. If a Boolean search formula allows a thorough search of only D, D (301) and H(L) (302) are the same set. Therefore, it is desirable to find the Boolean search formula L that satisfies such a condition. However, the Boolean search formula may not exist depending on the selection method of the document set D. Therefore, the Boolean search formula L that makes D^H(L) 303, which is a set of products of D and H(L), as large as possible is actually searched. In the present first embodiment, an F-measure is used as an objective function value for the search.

The F-measure is a harmonic average (307) of a recall R (304) and a precision P (305). The recall R denotes a degree of exhausirive search of D based on the Boolean search formula L and is equivalent to a proportion of the documents included in the document set D within the search result H(L) to the document set D. The precision P denotes a degree of searching only D based on the Boolean search formula L and is equivalent to a proportion of the documents included in the document set D within the search result H(L) to the search result H(L).

When a formula 304 and a formula 305 are assigned to a formula 307, a formula of the F-measure is expressed by a formula 308. The denominator of the formula 308 is a sum of the area of D (301) and the area of H(L) (302), and the numerator of the formula 308 is twice the area of D^H(L) (303) that is a set of products of the area of D (301) and the area of H(L) (302). When D and H(L) are the same, the F-measure is a maximum value 1. When D and H(L) do not overlap at all, the F-measure is a minimum value 0.

In the present first embodiment, the F-measure is adopted as a standard for evaluating the Boolean search formula L, and the recall R and the precision P are equally and harmonically averaged. However, one of the recall R and the precision P may be valued by weighting. Depending on an application, there is a case in which it is desirable to value one of the precision and the recall even if the other is sacrificed. In such a case, one of the precision and the recall may be valued and weighted.

Although a F-measure shown in the formula 308 is used as a standard for evaluating the Boolean search formula L in the present first embodiment, an evaluation formula other than the formula 308 may be used as long as the recall R and the precision P are used in the evaluation formula.

A principle of generating the Boolean search formula L by the Boolean search formula generation unit 105 has been described. The Boolean search formula generation unit 105 can search the Boolean search formula L in which the F-measure shown in the formula 308 is the maximum. However, the search space may be enormous if a Boolean search formula in an arbitrary format can be allowed. The problem will be called a search space problem. To solve the search space problem, the format of the Boolean search formula is limited to the standard sum of products form in the present invention, and D is searched by a greedy algorithm in each term of the products constituting the Boolean search formula. The search method is compatible with the maximization of the F-measure. Details will be described later.

The standard sum of products form is a format in which terms constituted by products (*) of search terms are connected by a sum (+), such as (a*b*c)+(d*e)+(f*g). In the present invention, the products constituting the standard sum of products form are generated based on a repetition process. There are three products in the example, and the repetition process is executed three times.

In each repetition process, products that can cover the currently provided document set as large as possible and that allows searching with less noise are searched. The F-measure is used for the objective function here.

The documents that can be searched by the generated products are removed from the provided base document set, and the same process is repeated for the remaining document set as a new base set. The repetition process is terminated when there is no more remaining documents or when the number of documents that can be newly covered is smaller than a predetermined threshold.

Figure 4:
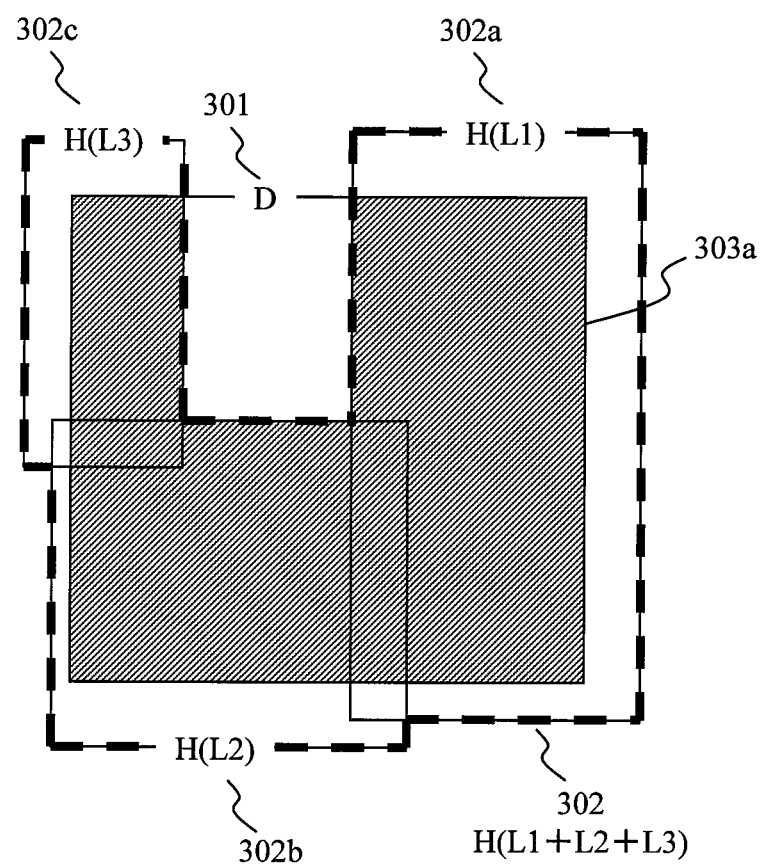
FIG. 4 is a diagram conceptually showing a process of searching the Boolean search formula L by the Boolean search formula generation unit 105.

FIG. 4 is a diagram conceptually showing a process of searching the Boolean search formula L by the Boolean search formula generation unit 105. Hereinafter, a processing procedure shown in FIG. 4 will be described.

(FIG. 4: Processing Procedure Step 1)

The Boolean search formula generation unit 105 generates a Boolean search formula L1 constituted by products of search terms. The Boolean search formula generation unit 105 searches L1 in which the F-measure is the maximum. In the process of searching L1, the Boolean search formula generation unit 105 optimizes the search terms constituting the products and the number of search terms. For example, a result "L1=a*b*c" is obtained. The document set covered by the Boolean search formula L1 is H(L1) (302a) of FIG. 4. A part D^H(L1) where D and H(L1) overlap is an oblique-line area 303a of FIG. 4.

(FIG. 4: Processing Procedure Step 2)

The Boolean search formula generation unit 105 applies the same process as step 1 to the part excluding H(L1) from the document set D to generate a Boolean search formula L2 in which the F-measure is the maximum. The Boolean search formula L2 is constituted by products of search terms. For example, a result "L2=d*e" is obtained. The document set covered by L2 is H(L2) (302b) of FIG. 4.

(FIG. 4: Processing Procedure Step 3)

The Boolean search formula generation unit 105 applies the same process as in step 1 to the part excluding H(L1) and H(L2) from the document set D to generate a Boolean search formula L3 in which the F-measure is the maximum. The Boolean search formula L3 is constituted by products of search terms. For example, a result "L3=f*g" is obtained. The document set covered by L3 is H(L3) (302c) of FIG. 4.

(FIG. 4: Processing Procedure Step 4)

The Boolean search formula generation unit 105 repeats the same process for a predetermined number of times or until the uncovered range of the document set D is smaller than a predetermined range. It is assumed here that the number of times of repetition is three times. The Boolean search formula generation unit 105 connects the Boolean search formulas obtained in the steps by a sum to set an ultimate Boolean search formula L. In this case, L=L1+L2+L3=(a*b*c)+(d*e)+(f*g).

(FIG. 4: Processing Procedure Step 4: Supplement)

A part surrounded by a dotted line of FIG. 4 is the document set that can be covered by the Boolean search formula L. The products L1 to L3 in which the F-measure is locally maximum are generated in steps 1 to 3, and the F-measure of the standard sum of products form connecting the products L1 to L3 is also a large value accordingly. The greedy algorithm for repeatedly acquiring the local optimal solutions is used to generate the Boolean search formula L. Therefore, although a global maximum value may not be always obtained, the massive increase in the search space can be prevented.

Figure 5:
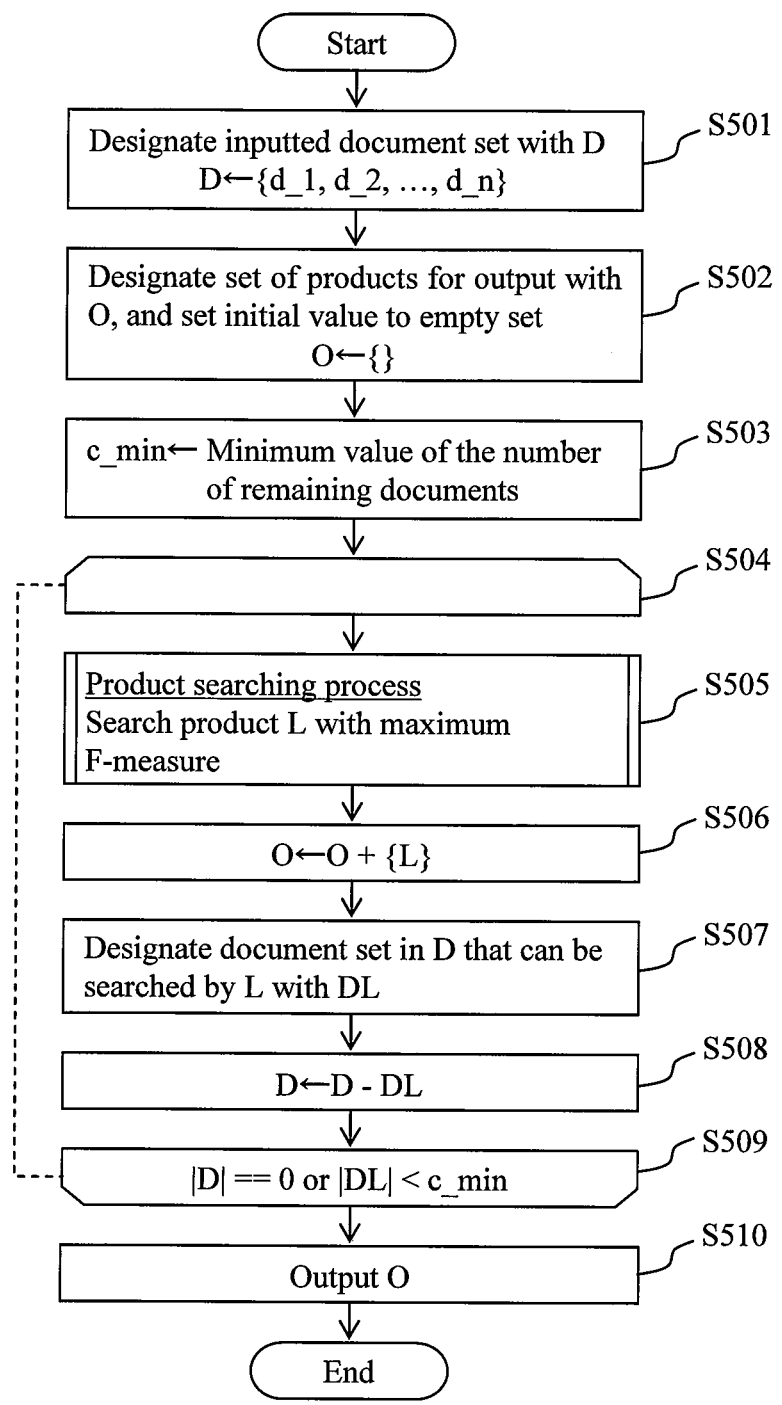
FIG. 5 is a flow chart for explaining a search procedure described in FIG. 4.

FIG. 5 is a flow chart for explaining the search procedure described in FIG. 4. Steps of FIG. 5 will be described.

(FIG. 5: Step S501)

The Boolean search formula generation unit 105 acquires the documents constituting the base document set D. Elements $d\_i$ of D are identifiers of the documents. The Boolean search formula generation unit 105 may query the search server 12 for the constituent elements of the document set D, or the user may input the constituent elements.

(FIG. 5: Step S502)

The Boolean search formula generation unit 105 designates the set of products for the Boolean search formula L with O and initializes O by an empty set.

(FIG. 5: Step S503)

The Boolean search formula generation unit 105 sets a threshold of the number of remaining documents $c\_min$ for determining whether to end the process. The threshold $c\_min$ will be described again in step S509. The value of $c\_min$ may be stored in advance in the memory 102, etc., or the user may input the value.

(FIG. 5: Step S504)

The Boolean search formula generation unit 105 repeats the following steps S505 to S508 until a condition described in step S509 is satisfied.

(FIG. 5: Step S505)

The Boolean search formula generation unit 105 searches the Boolean search formula L in which the F-measure is the maximum. The Boolean search formula L is constituted by products of search terms. The present step corresponds to the processes of searching L1 to L3 in steps 1 to 3 described in FIG. 4, respectively. Details of the present step will be described again in FIG. 6.

(FIG. 5: Step S506)

The Boolean search formula generation unit 105 adds the Boolean search formula L obtained in step S505 as a constituent element of the set O.

(FIG. 5: Steps S507 and S508)

The Boolean search formula generation unit 105 designates the document set that can be searched using the Boolean search formula L obtained in step S505 with DL (S507). The Boolean search formula generation unit 105 subtracts DL from the document set D to set a new base document set D (S508).

(FIG. 5: Step S509)

The Boolean search formula generation unit 105 ends the repetition process of steps S505 to S508 if the base document set D is empty or if the number of documents (the number of elements of DL) newly searched in step S505 is smaller than the threshold c_min. The Boolean search formula generation unit 105 returns to step S505 to repeat the same process if neither condition is satisfied.

(FIG. 5: Step S509: Supplement)

In the present step, the repeated search is finished if the number of documents that can be newly covered in D is below c_min. The end condition is required to prevent generating a too specific products that can only cover significantly few documents in D. Since the greedy algorithm is used to search the Boolean search formula L in the present first embodiment, the number of documents that can be newly covered tends to decrease with the progress of the repetition process. Therefore, it is unlikely that the number of documents that can be covered starts to increase, and the repeated search can be immediately finished when the number of elements of DL falls below c_min.

(FIG. 5: Step S510)

The Boolean search formula generation unit 105 outputs O storing the Boolean search formula to the display control unit 106. For example, a Boolean search formula L=(a*b*c)+(d*e)+(f*g) is generated from O={a*b*c, d*e, f*g}.

Figure 6:
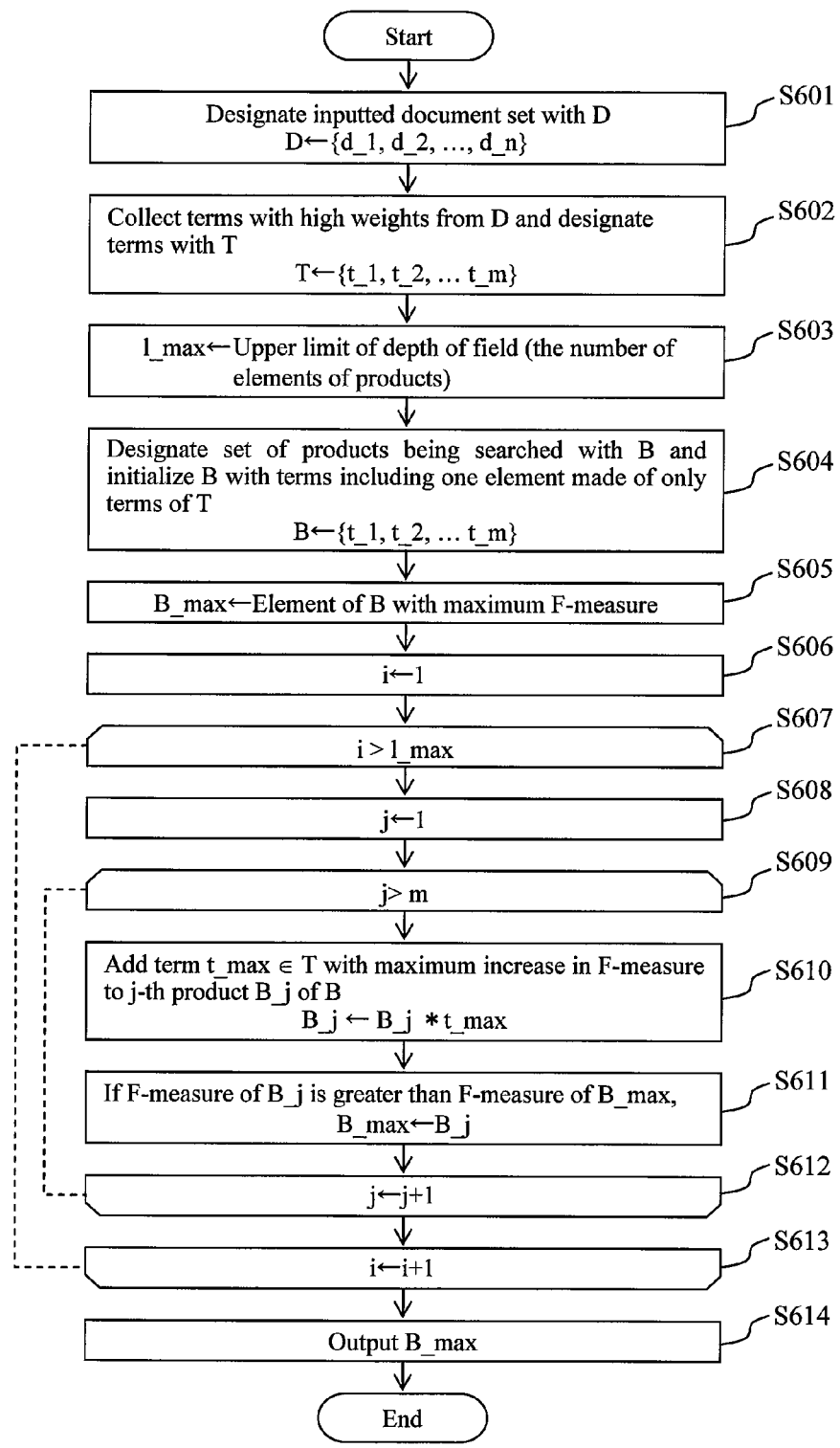
FIG. 6 is a flow chart showing a detailed process of step S505 of FIG. 5.

FIG. 6 is a flow chart showing a detailed process of step S505 of FIG. 5. Steps of FIG. 6 will be described.

(FIG. 6: Step S601)

The Boolean search formula generation unit 105 acquires the documents constituting the base document set D. The base document set D in the present step is equivalent to D obtained in steps S501 and S508.

(FIG. 6: Step S602)

The Boolean search formula generation unit 105 collects search terms (keywords) as candidates for constituting the products of the Boolean search formula generated in step S505, and the search terms will be treated as a set of search terms T. All terms in the documents of D may be inputted in T, or a predetermined number of terms with high weights in D may be inputted to T.

(FIG. 6: Step S602: Supplement 1)

An example of the weight that serves as a standard for selecting the terms inputted to the set of search terms T in the present step includes an IDF (Inverse Document Frequency) value. The value of the weight may be queried to the search server 12, or the Boolean search formula generation unit 105 may calculate the value. An arbitrary known method can be used for data necessary to calculate the weight or for a method of calculating the weight.

(FIG. 6: Step S602: Supplement 2)

Although words (part of speech) are used as the search terms in the present first embodiment, character N-grams, etc., may also be used.

(FIG. 6: Step S603)

The Boolean search formula generation unit 105 sets an upper limit l_max of a depth of search. The depth of search is equivalent to the number of elements constituting the products included in the Boolean search formula L. For example, if the products of three search terms at the maximum are set as the search range in step S505, l_max=3. In this case, the maximum number of search terms that can be connected by the products is three.

(FIG. 6: Step S604)

The Boolean search formula generation unit 105 initializes a set B for holding the searched point and sets search start points. For example, for the start points, all terms included in T are registered in the set B without logical connection. In this case, for example, B={a, b, c, ... }. An example of another method for initializing the set B includes a method of extracting only a predetermined number of search terms with large F-measure and registering the terms in B.

(FIG. 6: Step S605)

The Boolean search formula generation unit 105 designates the search term with the largest F-measure among the search terms registered in the set B with B_max. Subsequently, the Boolean search formula generation unit 105 updates B_max every time products of search terms with greater F-measure is obtained.

(FIG. 6: Steps S606 and S607)

The Boolean search formula generation unit 105 initializes a variable i that indicates the depth of search (S606). The Boolean search formula generation unit 105 repeats the following steps S607 to S613 until the search depth i exceeds the upper limit l_max. Steps S607 to S613 are a search process for the search depth i. Therefore, a breadth-first search is performed in steps S607 to S613.

(FIG. 6: Steps S608 and S609)

The Boolean search formula generation unit 105 initializes a variable j that indicates an index of the constituent elements of the set B (S608). The Boolean search formula generation unit 105 repeats the following steps S610 to S612 up to a final element number m of the set B (S609).

(FIG. 6: Step S610)

The Boolean search formula generation unit 105 connects a search term in the set T to a j-th element B_j of the set B by a product. The selected search term connected by the product is a search term that increases the F-measure the most by the connection. Therefore, the search term is searched by a hill-climbing algorithm in the present step.

(FIG. 6: Step S610: Supplement)

Although only the best product that maximize the F-measure is connected in the description, the second best product and the third best product can be additionally considered to secure a large search range. In this case, although the set B that holds the current search point also becomes large as the search progresses, the upper limit value of the number of elements of the set B can be predetermined, and a method of preferentially registering the elements in descending order of the F-measure in the set B can be used.

(FIG. 6: Step S611)

The Boolean search formula generation unit 105 updates B_max with B_j if the F-measure of the element B_j newly combined with the search term in step S610 is greater than the F-measure of the current B_max.

(FIG. 6: Step S612)

The Boolean search formula generation unit 105 increments the variable j by 1. The Boolean search formula generation unit 105 returns to step S609 to repeat the same process if j does not reach the final element number m of the set B and ends the repetition process of steps S609 to S612 if j reaches the final element number m of the set B.

(FIG. 6: Step S613)

The Boolean search formula generation unit 105 increments the variable i by 1. The Boolean search formula generation unit 105 returns to step S607 to repeat the same process if i does not reach the search depth upper limit l_max and ends the repetition process of steps S607 to S613 if i reaches the search depth upper limit l_max.

(FIG. 6: Step S614)

The Boolean search formula generation unit 105 outputs the current B_max as a result of the present process.

First Embodiment

Summary

A method of generating a Boolean search formula by the Boolean search formula generation apparatus 10 according to the present first embodiment has been described. The Boolean search formula generation apparatus 10 can automatically generate a Boolean search formula equivalent to the search result of the similarity search.

The Boolean search formula generation apparatus 10 according to the present first embodiment generates the Boolean search formula L in a standard sum of products form. This can prevent a massive increase in the search space in searching the optimal Boolean search formula L.

The Boolean search formula generation apparatus 10 according to the present first embodiment evaluates the Boolean search formula L for each products of search terms based on the recall R and the precision P. As a result, the Boolean search formula L can be optimized for each products.

Second Embodiment

The method of evaluating the Boolean search formula L using the recall R and the precision P is described in the first embodiment. To calculate the precision P, the number of documents satisfying the Boolean search formula L, i.e. the number of hits |H(L)| needs to be acquired. Therefore, the Boolean search formula generation unit 105 should query the search server 12 for |H(L)| as necessary.

However, the accurate value of |H(L)| is not known unless the Boolean search formula L is actually used to carry out the search. The Boolean search formula L is evaluated many times in the search process of the first embodiment, and the processing load of the search by the search server 12 increases. The problem will be called a problem of acquiring the number of global hits.

Therefore, in place of the actual search, the number of global hits of each keyword constituting the Boolean search formula L is used to approximate |H(L)| in a second embodiment of the present invention. In this way, an attempt is made to reduce the load of search to solve the problem of acquiring the number of global hits.

Since the configuration of the search system 1000 is the same as in the first embodiment, a method for solving the problem of acquiring the number of global hits will be mainly described.

Figures 7, 8:
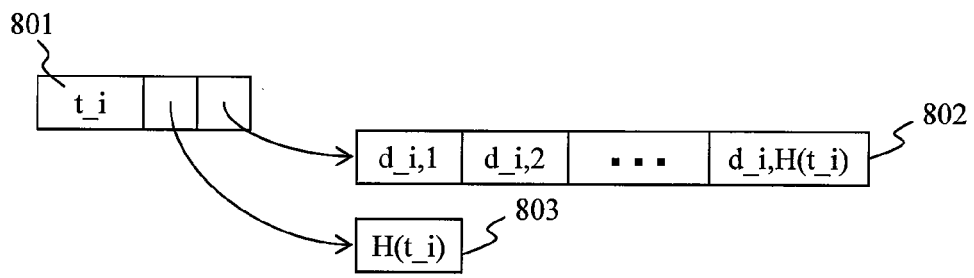
FIG. 7 is a diagram for explaining a method of approximate calculation of H(L) by the Boolean search formula generation unit 105.
FIG. 8 is a block diagram of a search index 123 included in a search server 12.

FIG. 7 is a diagram for explaining a method of approximate calculation of H(L) by the Boolean search formula generation unit 105. A procedure shown in FIG. 7 will be described formula by formula.

(FIG. 7: Formula 701)

The Boolean search formula generation unit 105 acquires the Boolean search formula L as a target of acquiring the number of hits |H(L)| in steps (S605 and S610) of calculating the F-measure among the steps of FIG. 6. The Boolean search formula generation unit 105 obtains |H(L)| for each products constituting the Boolean search formula L. Therefore, L in the present step denotes products of search terms. It is assumed here that $L=t\_1*t\_2* \ldots *t\_k$. In the formula, $t\_i$ denotes each search term.

(FIG. 7: Formula 702)

The Boolean search formula generation unit 105 acquires a total number of documents N to be searched. The value of N may be queried to the search server 12, or the user may input the value.

(FIG. 7: Formula 703)

If a probability that a document can be searched by the Boolean search formula (product) L is defined as P(L), the number of documents H(L) that can be searched by L can be estimated by $P(L)*N$ (FIG. 7: Formula 704)

If the search terms $t\_1$ to $t\_k$ constituting the Boolean search formula (products) L independently appear in the document, $P(L) \approx P(t\_1)*P(t\_2)* \ldots *P(t\_k)$.

(FIG. 7: Formula 705)

$P(t\_i)$ denotes a probability that a document can be searched by the search term $t\_i$, and the probability can be estimated by the ratio of the number of hits $H(t\_i)$ of $t\_i$ to the total number of documents N.

(FIG. 7: Formula 706)

According to the formulas 701 to 705, it can be understood that approximate calculation of H(L) to be calculated is possible based on a formula 706 using products of the number of hits $H(t\_i)$ of the search terms. The Boolean search formula generation unit 105 can use the formula 706 for the approximate calculation of H(L).

Specific implementation means for the approximate calculation of |H(L)| will now be described.

FIG. 8 is a block diagram of the search index 123 included in the search server 12. It is effective to use data held in the search index 123 in order for the Boolean search formula generation unit 105 to quickly acquire the number of hits $H(t\_i)$ of each term $t\_i$.

The search index 123 includes search terms $t\_i$ (801) and a list of documents (802) including the search terms $t\_i$. The length of the list 802 is equivalent to the number of hits $H(t\_i)$ in the search using the search terms $t\_i$. The search server 12 can calculate and hold $H(t\_i)$ in advance (803). In either case, the Boolean search formula generation unit 105 can use the data held in the search index 123 to quickly acquire $H(t\_i)$. Therefore, quick approximate calculation of |H(L)| is possible.

Second Embodiment

Summary

As described, the Boolean search formula generation apparatus 10 according to the present second embodiment acquires the number of hits of each search term $t\_i$ held in the search index 123 and uses the value for the approximate calculation of the number of hits |H(L)| based on the Boolean search formula L. As a result, the search does not have to be carried out every time the number of hits |H(L)| is acquired. The load of search is reduced, and the process of generating the Boolean search formula L can be speeded up.

Third Embodiment

In the first embodiment, the Boolean search formula generation unit 105 needs to obtain $|D\char`\^H(L)|$ to calculate the recall R and the precision P. $|D\char`\^H(L)|$ denotes the number of documents hit by the Boolean search formula L in the base document set D, and the accurate value is not known without the actual search. The problem will be called a problem of acquiring the number of local hits.

Compared to the number of global hits |H(L)|, the number of local hits $|D\char`\^H(L)|$ significantly affects the precision of the generated products. Therefore, it is desirable to acquire the value through the actual search as long as the processing time allows the search. If $|D\char`\^H(L)|$ cannot be acquired within a realistic time, the search index 123 may be used to assist the Boolean search formula generation unit 105.

Therefore, a method in which a list of search terms included in the documents is stored in advance in the search index 123, and the list is used to acquire $|D\char`\^H(L)|$ will be described in a third embodiment of the present invention.

Figure 9:
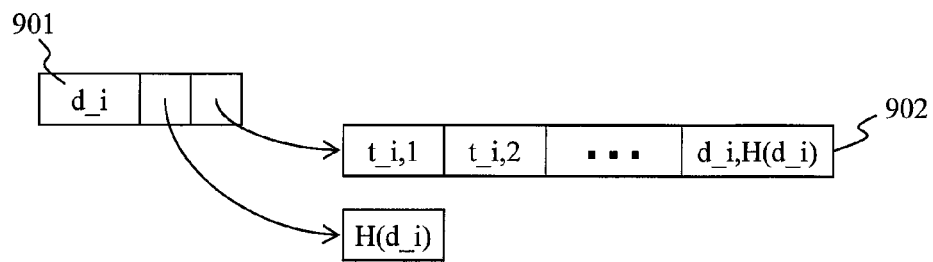
FIG. 9 is a diagram showing an example of configuration of the search index 123 in a third embodiment.

FIG. 9 is a diagram showing an example of configuration of the search index 123 according to the present third embodiment. In the present third embodiment, the search index 123 holds data shown in FIG. 9 in addition to the configuration described in FIG. 8. Other configurations are the same as in the first and second embodiments.

The search index 123 holds a list of search terms (902) included in each document d_i (901) included in the base document set D. In the calculation of the number of local hits |D^H(L)|, the Boolean search formula generation unit 105 queries the search server 12 whether all search terms included in the Boolean search formula L are included in the search term list 902 of the document d_i. As a result, |D^H(L)| can be quickly obtained.

When the search index 123 does not hold the data shown in FIG. 9, the presence/absence of terms in the documents d_i need to be analyzed on the fly by, for example, scanning the text of the document d_i. This is reasonable if few documents are included in the base set D and |D^H(L)| can be acquired within a realistic time.

Third Embodiment

Summary

As described, the Boolean search formula generation apparatus 100 according to the present third embodiment uses the list of search terms (902), which is held in the search index 123 and included in the documents d_i (901), to calculate the number of local hits |D^H(L)|. As a result, compared to a case in which |D^H(L)| is calculated by scanning the documents in D, the processing load can be reduced, and the Boolean search formula L can be quickly generated.

Fourth Embodiment

A procedure of estimating |D^H(L)| by an approximation method using sampling will be described in a fourth embodiment of the present invention. Other configurations are the same as in the third embodiment.

Figure 10:
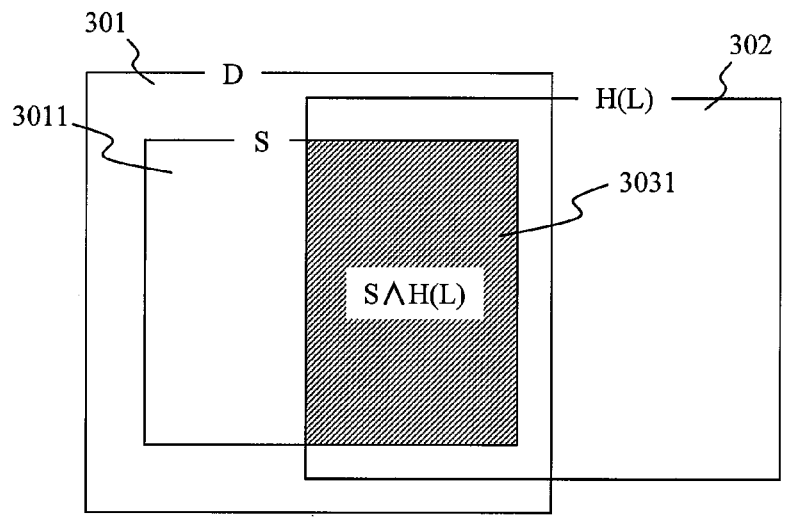
FIG. 10 is a diagram for explaining a method of calculating an F-measure after sampling part of the document set D.

FIG. 10 is a diagram for explaining a method of calculating the F-measure after sampling part of the document set D. It is desirable to use random sampling in the sampling method. A set S (3011) of FIG. 10 is a document set obtained by sampling part of the document set D (301).

Since the set S is extracted by random sampling, statistics related to the set D can be estimated by multiplying statistics related to the set S by |D|/|S|. Therefore, the number of local hits |D^H(L)| can be estimated by multiplying the number of local hits |S^H(L)| related to the set S by a coefficient |D|/|S|.

In this way, a calculation formula 1001 for calculating the F-measure of the document set D can be approximated by a calculation formula 1002 of FIG. 10. The Boolean search formula generation unit 105 can use the calculation formula 1002 for the approximate calculation of the F-measure. As the calculation formula 1002 is used, the number of local hits is acquired within a range of the set S with fewer documents than the set D. Therefore, the processing load of calculating the F-measure can be reduced, and the Boolean search formula L can be more quickly generated.

Fifth Embodiment

The calculation formula 1002 described in the fourth embodiment can also be used to set a desired number of hits X of the products L. In this case, the set S is provided by extracting part of the document set D of the number of elements X in which the constituent elements are unclear, and an object is to generate the products L for searching the document set D. It is assumed that the given document set S is extracted by random sampling from the virtual document set D of the number of elements X.

In this case, if the Boolean search formula L that can accurately search only the document set D is generated, the Boolean search formula L in which the number of hits is X can be obtained as a consequence. Therefore, the Boolean search formula generation unit 105 can perform the search by aiming the Boolean search formula L that realizes the calculation formula 1001 in which F-measure=1, |D|=X, and |H(L)|=X are assigned. If the document set S is provided, the number of elements of S can be assigned to |S| of the calculation formula 1002, and then the Boolean search formula L that realizes the formula can be searched.

Since |D|=X set here is a desired value, the Boolean search formula generation unit 105 may not be able to always generate the Boolean search formula L that accurately hits X times.

Sixth Embodiment

An example of operation in consideration of weights (search scores) of documents constituting the base document set D will be described in a sixth embodiment of the present invention. The configuration of the search system 1000 is the same as in the first to fifth embodiments.

In the similarity search, the search results are generally obtained in a state in which the documents are ranked by the similarity with the text inputted as a search condition. For example, a case in which top 100 documents are selected from the results of the similarity search to set the documents as the base set D to generate the Boolean search formula L equivalent to the set D will be considered. Even if Boolean search formulas can search the same 99 documents in the set D, it can be stated that the Boolean search formula that cannot search the document ranked No. 100 more accurately expresses the set D, compared to the Boolean search formula that cannot search the document ranked No. 1. Therefore, it can be stated that the Boolean search formula that covers more higher-ranked documents is preferable between the Boolean search formulas that cover the same number of documents.

In the present sixth embodiment, the Boolean search formula generation unit 105 takes search scores into consideration to calculate the F-measure so that the Boolean search formula L that searches more documents in higher search rank can be generated. The search scores are evaluation values used to rank the search results. The higher the score values, the higher the rank.

To generate the Boolean search formula L that can preferentially search documents with high search scores, the Boolean search formula generation unit 105 uses a total search score of documents in the set D in place of |D| (the number of documents in the set D) of the calculation formula 304. Similarly, the Boolean search formula generation unit 105 uses the total search score of documents in the set D hit by the Boolean search formula L in place of |D^H(L)|. As a result, the search scores of the documents that can be covered by the Boolean search formula L is taken into account in the value of the recall R calculated by the calculation formula 304.

Similarly, the Boolean search formula generation unit 105 uses the total search score of documents hit by the search using the Boolean search formula L, in place of |H(L)| of the calculation formula 305. However, since it is difficult to acquire the search scores of documents not included in the set D, the search scores of the documents is assumed as minimum search scores of the documents in the set D. The value |D^H(L)| of the calculation formula 305 is the same as in the calculation formula 304.

The search scores of the documents can be acquired when the data communication unit 107 acquires the search result from the search server 12.

Sixth Embodiment

Summary

As described, the Boolean search formula generation apparatus 10 according to the present sixth embodiment uses an evaluation formula with the search scores to evaluate the Boolean search formula L. This can obtain the Boolean search formula L that can preferentially search higher ranked documents. Therefore, the Boolean search formula compatible with the search needs can be generated.

Seventh Embodiment

A configuration in which the search results are clustered, and a Boolean search formula is generated and displayed for each cluster will be described in a seventh embodiment of the present invention. The seventh embodiment is the same as the first to sixth embodiments except a process and screen display related to clustering, and the differences will be mainly described.

In the present seventh embodiment, the Boolean search formula generation unit 105 clusters the document set obtained as search results. The clustering is a process of dividing the document set into subsets (clusters). Similar documents are collected in each subset. The Boolean search formula generation unit 105 can use an arbitrary known clustering method.

The search results are organized by related topics when the search results are divided into subsets by clustering. Therefore, the visibility of the search results improves, and the search results can be easily narrowed down. Meanwhile, it is difficult to check the topics included in the documents of each cluster. In a conventional document such as "Scatter/Gather: a cluster-based approach to browsing large document collections", Cutting, D., Karger, D., Pedersen, J., Tukey, J. pp. 318-329, ACM SIGIR'92, 1992, distinctive words included in each cluster are displayed with the search results. However, it is difficult to sufficiently display the topic included in the cluster just by the distinctive words. Therefore, a Boolean search formula that can search the document set included in each cluster is generated in the present seventh embodiment, and the formula is displayed along with the cluster.

Figure 11:
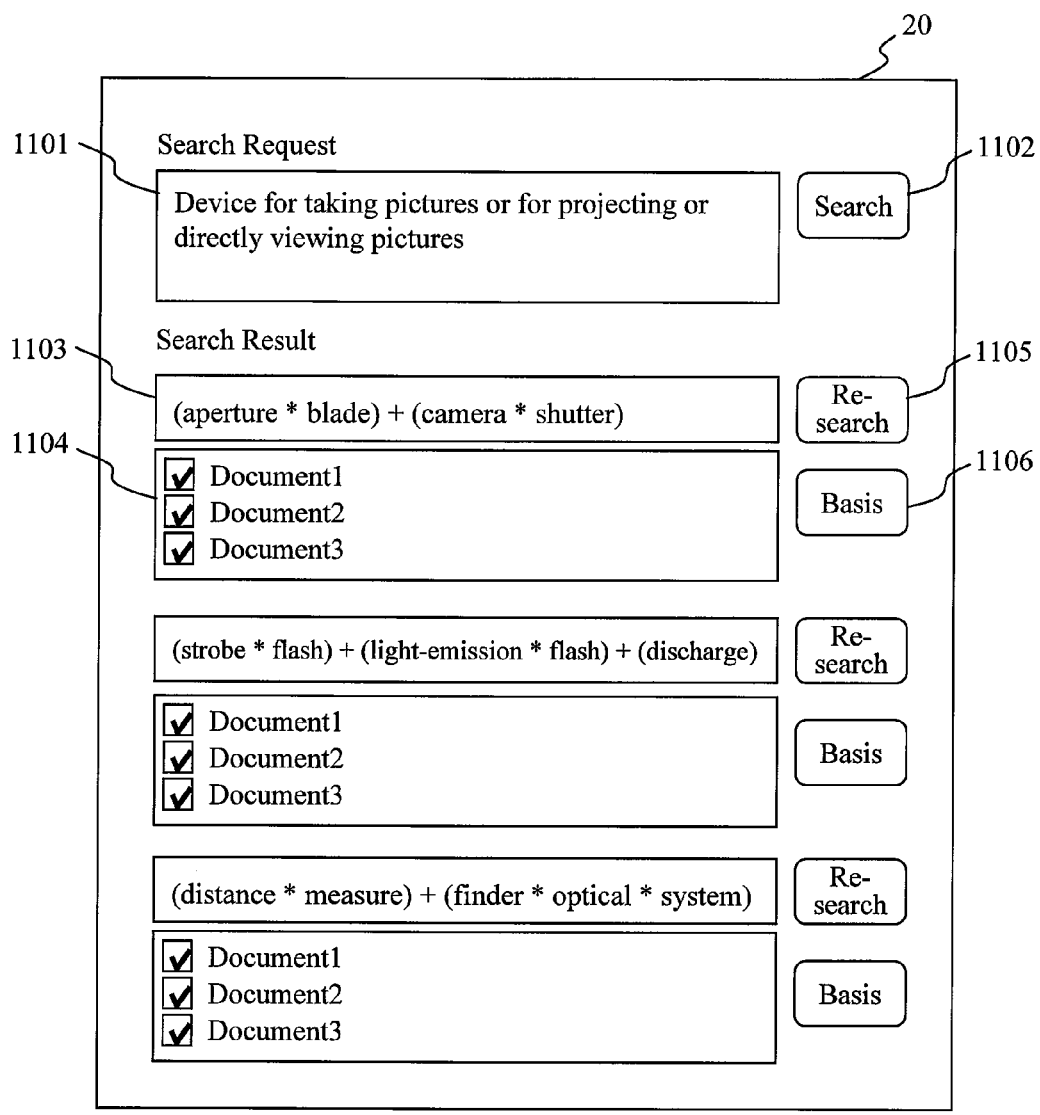
FIG. 11 is an example of screen image of a search interface screen 20 according to a seventh embodiment.

FIG. 11 is an example of screen image of the search interface screen 20 according to the present seventh embodiment. A procedure of an operation of the search interface screen 20 of FIG. 11 will now be described.

(FIG. 11: Operational Procedure Step 1)

The user inputs a search request to a text input area 1101. A text is inputted in the similarity search, while a Boolean search formula is inputted in the full text search. An example of the similarity search is illustrated here. A text "Device for taking pictures or for projecting or directly viewing pictures" is inputted as a search request.

(FIG. 11: Operational Procedure Steps 2 and 3)

When the user clicks a search button 1102, the same process as the process described in steps 2 and 3 of FIG. 2 is executed.

(FIG. 11: Operational Procedure Step 4)

The display control unit 106 receives the search results via the data communication unit 107. The Boolean search formula generation unit 105 clusters the document set included in the search results to divide the document set into subsets. The display control unit 106 provides a display area 1104 for each cluster and displays a document list in the cluster in each display area 1104. The display content of the display area 1104 is the same as in FIG. 2.

(FIG. 11: Operational Procedure Step 5)

The display control unit 106 provides a basis button 1106 for each cluster. When the user clicks the basis button 1106, the display control unit 106 transfers the identifiers of the documents selected in the display area 1104 to the Boolean search formula generation unit 105. The Boolean search formula generation unit 105 generates a Boolean search formula that can search the document set selected in the cluster. The user can select only necessary documents from the documents of the cluster to correct the document list included in the cluster in accordance with the user's preference.

(FIG. 11: Operational Procedure Step 6)

The display control unit 106 provides a text input area 1103 for each cluster. The display control unit 106 displays the Boolean search formula of each cluster generated by the Boolean search formula generation unit 105 in the text input area 1103.

(FIG. 11: Operational Procedure Step 7)

The user can also directly correct the Boolean search formula displayed in the text input area 1103. When the user clicks a re-search button 1105, the display control unit 106 acquires the Boolean search formula inputted to the text input area 1103 and transmits a search request including the Boolean search formula as a search condition to the search server 12 via the data communication unit 107. The search server 12 uses the Boolean search formula to carry out the search, and the display control unit 106 displays the search results in the display area 1104.

Seventh Embodiment

Summary

As described, the Boolean search formula generation apparatus 10 according to the present seventh embodiment clusters the search results and displays the search results for each cluster. The Boolean search formula generation apparatus 10 also generates, for each cluster, a Boolean search formula that can search the documents included in the cluster. As a result, the user can easily figure out the contents of the clusters.

The Boolean search formula generation apparatus 10 according to the present seventh embodiment can also correct the Boolean search formula for each cluster to search the documents again. As a result, the user can obtain the same effects as in the first embodiment for each cluster.

Eighth Embodiment

A method of using the Boolean search formula generation apparatus 10 described in the first to seventh embodiments to generate a rule for automatically providing a controlled category will be described in an eighth embodiment of the present invention.

The controlled category is an identification code provided to each category by categorizing the documents based on the features of the content. The documents included in each category often include similar keywords. Therefore, if an appropriate Boolean search formula can be generated for each controlled category, it is likely that the documents that can be searched using the same Boolean search formula belong to the same category. Based on this, the Boolean search formulas are used as categorization rules in the present eighth embodiment.

The Boolean search formula generation unit 105 generates the Boolean search formula L for the document set (training data) D already provided with a controlled category C. The Boolean search formula generation unit 105 then determines whether a document d (test data) not provided with a controlled category yet can be searched by the generated Boolean search formula L corresponding to the controlled category C. If the document d can be searched by the Boolean search formula L, it can be predicted that the document d has the controlled category C. In this way, the controlled category can be automatically provided to the test data by the Boolean search formula L generated from the training data.

Although there are various methods for automatically categorizing the documents, an advantage of the present eighth embodiment is that the precision of the categorization rule (generated Boolean search formula) can be easily tuned by the user. The user can easily understand it because the categorization rule is the Boolean formula itself. The user can correct the automatically generated categorization rule if necessary.

Figure 12:
FIG. 12 is a diagram showing an example of an automatically generated categorization rule.

FIG. 12 is a diagram showing an example of the automatically generated categorization rule. In the example, a set of JP Patent Publications (Kokai) disclosed in 1993 with an IPC code of International Patent Classification A61B3 "Apparatus for testing the eyes; Instruments for examining the eyes" is used as the training data, and a Boolean search formula is automatically generated from the data.

A Boolean search formula "(optometry)+(inspection*personnel)+(ophthalmology*apparatus)+(optical*imaging*system)" is generated using the method described in the first embodiment. The Boolean search formula can be used as the categorization rule to automatically provide the controlled category to, for example, JP Patent Publications (Kokai) disclosed in 1994. The user may correct the categorization rule.

A method of reestablishing the categorization rule, in which the precision is greater than a certain value, based on the once generated categorization rule will be described.

There are evaluation standards of precision and recall in the document categorization. For example, a categorization rule "ophthalmology*apparatus" in the example described in FIG. 12 will be considered.

The recall denotes a proportion of the documents hit by "ophthalmology*apparatus" in the correct answer data (documents categorized in A61B3). Therefore, the recall indicates how much "ophthalmology*apparatus" can cover the correct answer. The precision denotes a proportion of the correct answer data in all texts hit by "ophthalmology*apparatus". Therefore, the precision indicates the accuracy of "ophthalmology*apparatus" as a categorization rule.

If the precision of the categorization rule is close to 100%, it is almost certain that the target controlled category can be provided to the documents hit by the categorization rule. It is sufficient if the user manually provides the controlled category only to the documents not hit by the categorization rule. Therefore, the cost in the operation of providing the controlled category can be reduced. A procedure of generating a categorization rule with more than a predetermined precision will be described with reference to FIG. 12.

(FIG. 12: Categorization Rule Generation Procedure Step 1)
The Boolean search formula generation unit 105 uses the procedure described in the first to seventh embodiments to calculate the precision and the recall in the training data, for each products constituting the Boolean search formula L. It is assumed here that four products "optometry", "inspection*personnel", "ophthalmology*apparatus", "optical*imaging*system" shown in the upper half of FIG. 12 are obtained.

(FIG. 12: Categorization Rule Generation Procedure Step 2)
The user inputs a desired precision value to the Boolean search formula generation apparatus 10. It is assumed here that precision≧0.8 is designated.

(FIG. 12: Categorization Rule Generation Procedure Step 3)
The Boolean search formula generation unit 105 extracts only products with 0.8 or more precision and connects the products by a sum. As a result, a Boolean search formula "(optometry)+(ophthalmology*apparatus)" with 0.8 or more precision can be generated for the training data. The value of the precision is calculated using the training data.

(FIG. 12: Categorization Rule Generation Procedure Step 4)
The Boolean search formula generation apparatus 10 presents the Boolean search formula obtained in step 3 to the user as a categorization rule. As a result, a target precision can be designated to automatically generate the categorization rule. If a categorization rule generated with a sufficiently high target precision is used, the controlled category can be automatically provided with a sufficient precision.

Eighth Embodiment

Summary

In this way, the Boolean search formula generation apparatus 10 according to the present eighth embodiment generates a Boolean search formula with a precision greater than a designated precision and presents the Boolean search formula as a document categorization rule. As a result, the controlled category can be automatically provided to the documents with high precision.

Ninth Embodiment

The Boolean search formula generation unit 105 may be arranged on the search server 12 in the first to eighth embodiments. When the search results are clustered as in the seventh embodiment, functional units that execute the clustering process may be newly provided separately from the Boolean search formula generation unit 105.

The functional units that carry out the clustering may be arranged on the Boolean search formula generation apparatus 10 or on the search server 12. If the search server 12 includes the clustering functional units, the search server 12 clusters the search results and transmits the list of clusters (document set) to the Boolean search formula generation apparatus 10.

Although the invention made by the present inventor has been specifically described based on the embodiments, it is obvious that the present invention is not limited to the embodiments, and various changes can be made without departing from the scope of the present invention.

All or part of the configurations, the functions, the processing units, etc., can be designed in, for example, an integrated circuit to be realized as hardware or can be realized as software based on the execution of programs for realizing the functions by a processor. Information of the programs, tables, etc., for realizing the functions can be stored in a storage device, such as a memory and a hard disk, or in a storage medium, such as an IC card and a DVD.

EXAMPLES

First Example

A result of evaluating the effectiveness of the Boolean search formula described in the first embodiment will be described in a first example of the present invention. To evaluate the effectiveness, the Boolean search formula L is used to actually search documents to generate a Boolean search formula from the searched document set, and whether the original Boolean search formula L can be restored is checked. If the search results using the Boolean search formula L exceed 300 documents, 300 documents are sampled for the evaluation.

Simple Boolean search formula connecting two search terms by a product or a sum are first used for the experiment. In this case, there is only one Boolean search formula that cannot be restored among 58 Boolean search formulas.

As for complicated Boolean search formulas including three or more search terms, 19 out of 52 Boolean search formulas can be completely restored. For example, Boolean search formulas, such as "(heat release+(heat*conduction)+ (transmission*heat))*sheet" and "(cable*(broadcast+TV))+ CATV" can be completely restored. The other 33 Boolean search formulas are partially restored in almost all cases. For example, "LED+light-emitting" is generated from the original Boolean search formula L "LED+(light-emitting*(diode+element))".

The part connected by the sum cannot be completely restored in almost all examples in which the restoration is partially successful. The main reason is a lack of samples. Although the number of hits of "LED+(light-emitting*(diode+element))" is over 50,000 in the example described above, only 300 documents are used for the restoration. The Boolean search formulas that cannot even be partially restored are Boolean search formulas in which the number of hits is below several documents.

Second Example

A result of using the categorization rule "(optometry)+ (ophthalmology*apparatus)" with 0.8 or more precision generated in FIG. 12 and providing International Patent Classification A61B3 to JP Patent Publications (Kokai) disclosed in 1994 (year after the training data) will be described in a second example of the present invention.

In the present second example, the controlled category can be provided with high precision of 94%. However, the recall is 59%, and the controlled category can be provided only to 59% of the documents that should be provided with the controlled category.

The remaining 41% of documents are manually categorized or categorized by human experts. However, the number of documents to which the providing operation should be applied can be reduced to less than half, compared to when the categorization rule is not used.

To further improve the precision of automatically providing the controlled category, for example, only "optometry" with the precision of 98% can be used as the categorization rule. A user may make corrections based on the automatically generated categorization rule.

DESCRIPTION OF SYMBOLS

10: Boolean search formula generation apparatus, 101: CPU, 102: memory, 103: keyboard/mouse, 104: display, 105: Boolean search formula generation unit, 106: display control unit, 107: data communication unit, 11: network, 12: search server, 121: CPU, 122: memory, 123: search index, 124: search unit, 125: data communication unit, 201: text input area, 202: text input area, 203: display area, 204: search button, 205: re-search button, 206: basis button, 207: select all button, 208: release all button, 209: check box, 1101: text input area, 1102: search button, 1103: text input area, 1104: display area, 1105: re-search button, 1106: basis button, 1000: search system.

What is claimed is:

1. A Boolean search formula generation apparatus comprising:
   a processor;
   a memory coupled with said processor;
   a Boolean search formula generation unit that generates one or more Boolean search formulas for searching a base set including one or more documents from a document set as a search target and stores the Boolean search formulas in the memory, where the base set is a first search result generated from a first search formula and each of the Boolean search formulas consists of search products including one or more search terms; and
   a search result acquisition unit that uses each of the Boolean search formulas to acquire second search results of searching the search target and that outputs the second search results of searching the search target to the Boolean search formula generation unit, wherein
   the processor controls the Boolean search formula generation unit to:
   acquire the second search results, which are obtained when the search target is searched using each of the Boolean search formulas, from the search result acquisition unit to calculate, for each of the Boolean search formulas, a recall indicating a proportion, to the base set, of the documents included in the base set among the second search results and a precision indicating a proportion, to the second search results, of the documents included in the base set among the second search results,
   evaluate each of the Boolean search formulas by an evaluation formula established using the respective recall and the respective precision, and
   combine the Boolean search formulas with maximum evaluation values based on the evaluation formula to generate a combined Boolean search formula expressed by a standard sum of products of the Boolean search formulas with maximum evaluation values, where the combined
   Boolean search formula approximates the base set generated by the first search formula,
   wherein:
   the search result acquisition unit acquires a number of hits of each search term in the search products from the number of hits of each search term recorded in a search index of the search target when the Boolean search formula generation unit calculates the precision of the search products, and
   the Boolean search formula generation unit uses the number of hits to approximate the precision.

2. The Boolean search formula generation apparatus according to claim 1, wherein the Boolean search formula generation unit uses a ratio of the number of hits to a total number of documents in the search target to estimate a hit probability of each search term in the search products and uses the estimated hit probability to approximate the precision of the search products.

3. The Boolean search formula generation apparatus according to claim 2, wherein the Boolean search formula generation unit multiplies the estimated hit probabilities of the search terms in the search products to estimate the number of hits when the search products are used as a search condition to search the search target and uses the estimated number of hits to approximate the precision.

4. The Boolean search formula generation apparatus according to claim 1, wherein the Boolean search formula generation unit refers to a list of the search terms that is recorded in the search index of each document belonging to the base set to acquire the number of documents included in the base set among the search results upon the calculation of at least one of the recall and the precision.

5. The Boolean search formula generation apparatus according to claim 1, wherein the Boolean search formula generation unit calculates at least one of the recall and the precision with respect to the document set sampled from the base set and evaluates the search products by an evaluation formula established using the calculation result and a sampling rate of the sampling.

6. The Boolean search formula generation apparatus according to claim 1, wherein
the search result acquisition unit acquires a weighting factor of each document in the search results searched using the search products as a search condition, and
the Boolean search formula generation unit uses the weighting factor to calculate at least one of the recall and the precision.

7. The Boolean search formula generation apparatus according to claim 6, wherein the Boolean search formula generation unit treats a minimum weighting factor among the weighting factors of the documents included in the base set as a weighting factor of document not included in the base set to approximate the precision of the search products.

8. The Boolean search formula generation apparatus according to claim 1, further comprising a display unit that displays the search results acquired by the search result acquisition unit, wherein the Boolean search formula generation unit generates the Boolean search formulas for obtaining the search results and displays the Boolean search formulas on the display unit along with the search results.

9. The Boolean search formula generation apparatus according to claim 8, wherein
the display unit includes input fields for correcting the Boolean search formulas generated by the Boolean search formula generation unit, and
the search result acquisition unit uses Boolean search formulas after the correction inputted in the input fields to acquire results of searching the documents and displays the results on the display unit.

10. The Boolean search formula generation apparatus according to claim 8, wherein
the Boolean search formula generation unit clusters the search results acquired by the search result acquisition unit, and
the display unit displays the search results for each cluster obtained by the clustering.

11. The Boolean search formula generation apparatus according to claim 10, wherein
the display unit includes the input fields for correcting the Boolean search formula generated by the Boolean search formula generation unit for each cluster obtained by the clustering, and
the search result acquisition unit acquires results of searching the documents using the Boolean search formulas after the correction inputted to the input fields and displays the results on the display unit for each cluster obtained by the clustering.

12. The Boolean search formula generation apparatus according to claim 1, wherein the Boolean search formula generation unit receives a designation value of the precision as an input and generates the Boolean search formulas with the precision greater than the designation value.

13. A search system comprising:
the Boolean search formula generation apparatus according to claim 1; and
a search server that searches the search target from an arbitrary Boolean search formula, wherein the search result acquisition unit acquires results of searching the search target using the Boolean search formula from the search server.

14. A Boolean search formula generation method comprising:
a Boolean search formula generation step of generating one or more Boolean search formulas for searching a base set including one or more documents from a document set as a search target, where the base set is a first search result generated from a first search formula and each of the Boolean search formulas consists of search products including one or more search terms; and
a search result acquisition step of using the one or more Boolean search formulas to acquire second search results of searching the search target, wherein in the Boolean search formula generation step,
the second search results, which are obtained when the search target is searched using each of the Boolean search formulas, are acquired from the search result acquisition step to calculate, for each of the Boolean search formulas, a recall indicating a proportion, to the base set, of the documents included in the base set among the second search results and a precision indicating a proportion, to the second search results, of the documents included in the base set among the second search results,
each of the Boolean search results are evaluated by an evaluation formula established using the respective recall and the respective precision, and
the Booleans search results with maximum evaluation values based on the evaluation formula are combined to generate a combined Boolean search formula expressed by a standard sum of products form of the Boolean search formulas with maximum evaluation values, where the combined Boolean search formula approximates the first search formula, wherein:
in the Boolean search formula generation step,
a number of hits of each search term in the search products are acquired from the number of hits of each search term recorded in a search index of the search target when the Boolean search formula generation unit calculates the precision of the search products, and
the number of hits are used to approximate the precision.

15. The Boolean search formula generation method according to claim 14, further comprising a step of receiving a designation value of the precision as an input, wherein in the Boolean search formula generation step the Boolean search formulas with the precision greater than the designation value are evaluated.

* * * * *